United States Patent
Yoshikawa et al.

(10) Patent No.: US 11,025,541 B2
(45) Date of Patent: Jun. 1, 2021

(54) TRANSPORTING A GTP MESSAGE TO A TERMINATION DEVICE

(71) Applicant: HEWLETT PACKARD ENTERPRISE DEVELOPMENT LP, Houston, TX (US)

(72) Inventors: Shinji Yoshikawa, Tokyo (JP); Younggil Yun, Tokyo (JP)

(73) Assignee: Hewlett Packard Enterprises Development LP, Houston, TX (US)

( * ) Notice: Subject to any disclaimer, the term of this patent is extended or adjusted under 35 U.S.C. 154(b) by 0 days.

(21) Appl. No.: 15/843,744

(22) Filed: Dec. 15, 2017

(65) Prior Publication Data
US 2019/0190826 A1  Jun. 20, 2019

(51) Int. Cl.
| | |
|---|---|
| H04L 12/721 | (2013.01) |
| H04L 12/741 | (2013.01) |
| H04L 12/931 | (2013.01) |
| H04L 29/12 | (2006.01) |
| H04W 40/02 | (2009.01) |

(52) U.S. Cl.
CPC ............. *H04L 45/66* (2013.01); *H04L 45/74* (2013.01); *H04L 49/351* (2013.01); *H04W 40/02* (2013.01); *H04L 61/1511* (2013.01); *H04L 61/3075* (2013.01); *H04L 61/6022* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,542,012 | A | 2/1951 | De et al. | |
| 6,233,458 | B1 * | 5/2001 | Haumont | H04W 76/20 455/445 |
| 7,724,688 | B2 * | 5/2010 | Yamada | H04L 12/2834 370/256 |
| 8,787,154 | B1 * | 7/2014 | Medved | H04L 45/64 370/225 |

(Continued)

FOREIGN PATENT DOCUMENTS

| | | |
|---|---|---|
| EP | 2542012 A1 | 1/2013 |
| EP | 3407645 A1 | 11/2018 |
| WO | 2017/126884 A1 | 7/2017 |

OTHER PUBLICATIONS

Bart Barton, "LTE and Beyond: PGW and SGW Selection Procedures in LTE," Mar. 14, 2013, pp. 1-2 [online], Retrieved from the Internet on Oct. 9, 2017 at URL: <http://www.lteandbeyond.com/2013/03/pgw-and-sgw-selection-procedures-in-lte.html>.

(Continued)

*Primary Examiner* — Yee F Lam
(74) *Attorney, Agent, or Firm* — Hewlett Packard Enterprise Patent Department (57) ABSTRACT

Examples provided herein transmits a General Packet Radio Service (GPRS) Tunneling Protocol (GTP) message between first and second termination devices. One or more Ethernet frames carrying a GTP message are received by a controller by the first termination device in response to the destination Media Access Control (MAC) address of the Ethernet frames matching a MAC address assigned to the controller. An IP address of a second termination device is selected as the destination for transporting the GTP message based on an element included in the received GTP message.

19 Claims, 8 Drawing Sheets

(56) References Cited

U.S. PATENT DOCUMENTS

| | | | |
|---|---|---|---|
| 8,861,547 B2* | 10/2014 | Gao | H04L 12/4633 370/469 |
| 9,083,587 B2 | 7/2015 | Babu et al. | |
| 9,450,817 B1* | 9/2016 | Bahadur | H04L 45/64 |
| 9,577,845 B2* | 2/2017 | Thakkar | H04L 12/66 |
| 9,648,542 B2 | 5/2017 | Hsu et al. | |
| 9,763,078 B1* | 9/2017 | Zheng | H04W 8/12 |
| 2005/0249194 A1 | 11/2005 | Anurag et al. | |
| 2006/0046728 A1* | 3/2006 | Jung | H04W 36/14 455/445 |
| 2006/0140149 A1* | 6/2006 | Kim | H04L 29/06027 370/331 |
| 2007/0104205 A1* | 5/2007 | Baik | H04L 29/12066 370/395.3 |
| 2007/0213060 A1 | 9/2007 | Shaheen | |
| 2007/0243821 A1* | 10/2007 | Hundscheidt | H04L 29/06 455/3.04 |
| 2007/0248064 A1 | 10/2007 | Shaheen | |
| 2009/0047947 A1 | 2/2009 | Giaretta et al. | |
| 2011/0075675 A1* | 3/2011 | Koodli | H04L 12/14 370/401 |
| 2011/0090852 A1 | 4/2011 | Ramle et al. | |
| 2011/0090911 A1* | 4/2011 | Hao | H04L 12/4633 370/395.53 |
| 2011/0310868 A1* | 12/2011 | Yang | H04W 68/00 370/338 |
| 2012/0063300 A1* | 3/2012 | Sahin | H04W 36/12 370/225 |
| 2012/0173661 A1* | 7/2012 | Mahaffey | H04L 67/14 709/217 |
| 2012/0269167 A1 | 10/2012 | Velev et al. | |
| 2012/0275430 A1* | 11/2012 | Wang | H04W 76/25 370/331 |
| 2013/0121298 A1 | 5/2013 | Rune et al. | |
| 2013/0138823 A1* | 5/2013 | Centemeri | H04L 67/141 709/228 |
| 2013/0195012 A1 | 8/2013 | Laitila et al. | |
| 2013/0272247 A1* | 10/2013 | Guo | H04W 76/32 370/329 |
| 2014/0016614 A1 | 1/2014 | Velev et al. | |
| 2014/0056290 A1* | 2/2014 | Pazhyannur | H04L 12/4625 370/338 |
| 2014/0078986 A1* | 3/2014 | Kaippallimalil | H04W 76/10 370/329 |
| 2014/0194111 A1* | 7/2014 | Aso | H04W 52/0235 455/419 |
| 2014/0328246 A1 | 11/2014 | Xu et al. | |
| 2015/0049610 A1 | 2/2015 | Kim et al. | |
| 2015/0117454 A1* | 4/2015 | Koponen | H04L 61/2532 370/392 |
| 2015/0146513 A1 | 5/2015 | Zakrzewski | |
| 2015/0188770 A1* | 7/2015 | Naiksatam | H04L 41/0893 370/254 |
| 2015/0208281 A1 | 7/2015 | Kim et al. | |
| 2015/0223190 A1 | 8/2015 | Backman | |
| 2015/0245249 A1 | 8/2015 | Grootwassink et al. | |
| 2015/0256349 A1 | 9/2015 | Kim et al. | |
| 2016/0173334 A1* | 6/2016 | Gavrilovic | H04L 45/745 709/222 |
| 2016/0234681 A1 | 8/2016 | Swissa et al. | |
| 2016/0277211 A1* | 9/2016 | Kumar | H04L 12/4633 |
| 2017/0126618 A1 | 5/2017 | Bhaskaran et al. | |
| 2017/0142613 A1 | 5/2017 | Singh et al. | |
| 2017/0149667 A1 | 5/2017 | Dahod et al. | |
| 2017/0171068 A1* | 6/2017 | Morper | H04L 45/74 |
| 2017/0199751 A1 | 7/2017 | Sama et al. | |
| 2017/0245316 A1 | 8/2017 | Salkintzis | |
| 2017/0325055 A1 | 11/2017 | Enomoto et al. | |
| 2018/0103502 A1 | 4/2018 | Kawasaki et al. | |
| 2018/0132099 A1* | 5/2018 | Li | H04W 8/26 |
| 2018/0338265 A1* | 11/2018 | Goel | H04W 28/0263 |
| 2019/0007984 A1 | 1/2019 | Kuroda et al. | |
| 2019/0045422 A1 | 2/2019 | Shimojou et al. | |
| 2019/0110324 A1* | 4/2019 | Xu | H04W 76/12 |
| 2019/0116118 A1* | 4/2019 | Kapela | H04L 12/4633 |
| 2019/0116624 A1* | 4/2019 | Tandon | H04L 63/102 |
| 2019/0124046 A1* | 4/2019 | Mehra | H04L 63/0245 |
| 2019/0190826 A1 | 6/2019 | Yoshikawa et al. | |
| 2019/0191471 A1 | 6/2019 | Yoshikawa et al. | |

OTHER PUBLICATIONS

Cisco Technology, Inc., "Configuring GPRS Tunneling Protocol Support," Jul. 31, 2011, pp. 1-12.

Cisco, "CLI Book 2. Cisco ASA Series Firewall CLI Configuration Guide, 9.7," Sep. 11, 2017, pp. 1-44 [online], Retrieved from the Internet on Oct. 9, 2017 at URL: <https://www.cisco.com/c/en/us/td/docs/security/asa/asa97/configuration/firewall/asa-97-firewall-config/inspect-mobile.htm>.

Erik Brands, "Flow-Based Monitoring of GTP Traffic in Cellular Networks," Master of Science Thesis, Jul. 20, 2012, pp. 1-64, University of Twente, Enschede, The Netherlands.

Sunny Kumar Lohani, "Performance of SDN-based LTE EPC Gateways," Oct. 2015, pp. 1-28, Department of Computer Science and Engineering, Indian Institute of Technology, Bombay, Mumbai, India.

European Search Report Received for EP Patent Application No. 18212238.2, dated Mar. 6, 2019, 11 pages.

* cited by examiner

TRANSPORTING A GTP MESSAGE TO A TERMINATION DEVICE

BACKGROUND

As wireless communication standards, the 3rd Generation (3G) and 4th Generation (4G) standards have been implemented, and the standardization of the 5th Generation (5G) is now under progress.

A Long Term Evolution (LTE) network is based on the 4G standard and includes an Evolved Universal Terrestrial Radio Network (eUTRAN), which is a wireless network, and an Evolved Packet Core (EPC), which is a core network. The wireless network (eUTRAN) is provided with one or more base stations called eNodeB, and the EPC is provided with a Mobility Management Entity (MME), a Serving Gateway (SGW) and a Packet data network Gateway (PGW). The EPC may include one or more MMEs, SGWs and PGWs.

The MME is a mechanism for handling a Control Plane (C-Plane) of network management, and is connected to a base station (e.g., eNodeB) through an interface called S1-MME. The MME is connected to a Home Subscriber Server (HSS) through an interface called S6a. The SGW is a gateway located in the EPC, and handles C-Plane signals, i.e., control signals, and User Plane (U-Plane) signals, i.e., user data. The SGW is connected to the base station (eNodeB) through an interface called S1-U, and to the MME through an interface called S11. The PGW is a gateway for connecting the wireless terminal to a packet data network (PDN), which is an external network such as the Internet. The PGW is connected to the SGW through interfaces called S5/S8-C and S5/S8-U, which handle the C-Plane and the U-Plane, respectively.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on. The term "transmitted" or "transported," as used herein, is defined as causing to pass on from one place to another. As such this includes directly (e.g., without an intervening element) or indirectly (with an intervening element). As used herein, the term "device" means a machine, apparatus, manufacture, and/or combination thereof.

Figure 1:
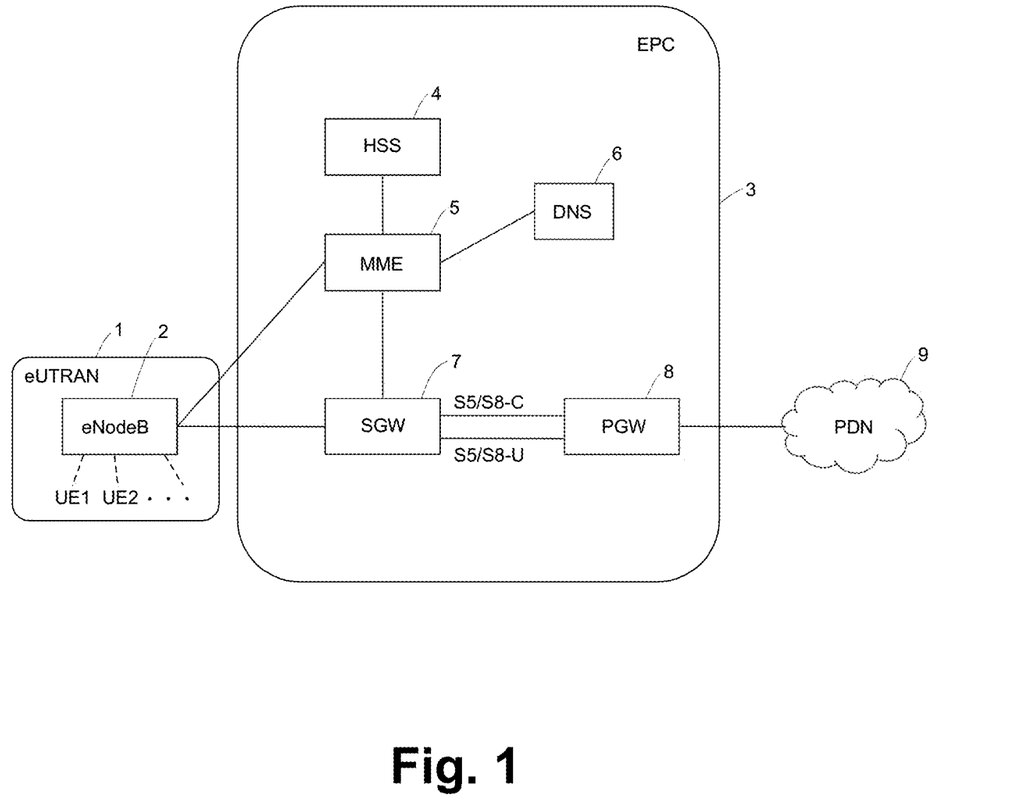
FIG. 1 is an example schematic block diagram showing a network configuration of an LTE network.

In an example LTE network configuration shown in FIG. 1, in an eUTRAN network 1, one or more wireless terminals, such as User Equipment (UE) UE1, UE2, etc. may be located within a cell supported by an eNodeB 2. To connect UE1 to a PDN 9 through a core network EPC 3, the UE1 may perform an attachment procedure to the EPC 3 through the eNodeB 2. The attachment procedure may start with the transmission of an Attach Request from the UE1 to the eNodeB 2. The Attach Request may be delivered to an MME 5 from the eNodeB 2 through an S1-MME interface, and the MME 5 may communicate with an HSS 4 through an S6a interface for performing such actions as registering the location of the UE1 and authenticating the UE1. The UE1 may be any wireless terminal, such as a mobile telephone, smartphone or tablet, or a terminal mounted on a mobile device such as an automobile or drone.

The MME 5 may query a Domain Name System (DNS) 6 using an Access Point Name (APN) associated with the Attach Request as a key, so as to acquire an Internet Protocol (IP) address of a PGW 8 in connection with which the establishment of a communication session between the UE1 and the PDN 9 may be requested. The MME 5 may also query the DNS 6 using the location information (Tracking Area (TA)) of the UE1 as a key, so as to acquire an IP address of a SGW 7 in connection with which the establishment of the communication session may be requested.

The MME 6 may generate a session establishing request, which is a request for establishing a network session. In the example LTE network, the session establishing request is a GTP message representing a Create Session Request for requesting the SGW 7 and the PGW 8 to create a session in the U-Plane, and the Create Session Request may be sent to the SGW 7 through an S11 interface. In the Fully Qualified Tunnel End Point Identifier (F-TEID) field of the Create Session Request, the SGW 7 may set the IP address of the PGW 8, i.e., a counterpart PGW with which a GTP session is to be established, as the IP address of an S5/S8-C interface with the PGW 8. The Create Session Request may be carried in one or more IP packets having the IP address of the PGW 8 as the destination IP address.

The PGW 8 may return to the SGW 7 a Create Session Response, with the F-TEID field including the address of the PGW 8 as the IP address of the S5/S8-C interface with the PGW 8. The SGW 7 may forward to the MME 5 the Response, with the F-TEID field including the IP address of the PGW 8 as the IP address of the S5/S8-C interface with the PGW 8 and the IP address of the SGW 7 as the IP address of the S11 interface with the SGW 7. The MME 5 notifies the eNodeB 2 of the acceptance of the Attach Request, and the IP address of an S1-U interface between the eNodeB 2 and the SGW 7 may be notified from the eNodeB 2 to the MME 5 over the S1-MME interface, and that IP address may be notified to the SGW 7 in the form of a Modify Bearer Request. Based on the successful transmission of these initial messages, a GTP session can be established between the eNodeB and the PDN 9 via the SGW 7 and the PGW 8.

Figure 2:
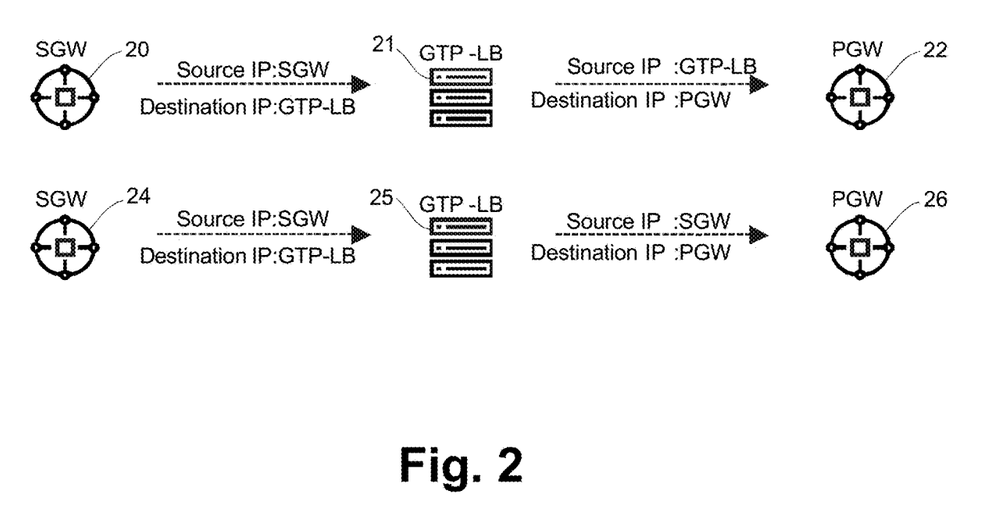
FIG. 2 illustrates example methods for routing C-Plane signals between an SGW and a PGW through a device called General Packet Radio Service (GPRS) Tunneling Protocol (GTP) Load Balancer (LB), i.e., GTP-LB.

One method of routing C-Plane signals between an SGW and a PGW according to GTP may be an IP termination method, an example of which is schematically shown in the upper part of FIG. 2. According to the IP termination method, among IP packets carrying GTP messages transmitted from an SGW 20, a GTP-LB 21 may receive IP packets whose destination IP address matches, i.e., corresponds to the IP address of the GTP-LB 21. The GTP-LB 21 may change the source address of the IP packets to the IP address of the GTP-LB 21 and the destination address to an IP address determined in accordance with a logic in the GTP-LB 21, and transport the IP packets to a PGW 22.

Like operations may be performed for transporting IP packets carrying GTP messages from the PGW 22 to the SGW 20. According to this method, C-Plane messages can be transported through the GTP-LB 21 between the SGW 20 and the PGW 22, throughout the establishment of the GTP session (e.g., before, during or after the establishment of a GTP session). While FIG. 2 shows the SGW 20 and the PGW 22 as termination devices for the C-Plane of GTP ("GTP termination devices") and the GTP-LB 21 is disposed between them, the GTP-LB 21 may be any device for routing GTP C-Plane signals and GTP termination devices are not limited to the SGW 20 and the PGW 22.

Another method of routing C-Plane signals according to the GTP may be a semi-transparent method, an example of which is schematically shown in the lower part of FIG. 2. According to the semi-transparent method, among IP packets carrying GTP messages transmitted from an SGW 24, a GTP-LB 25 may receive IP packets whose destination IP address matches the IP address of the GTP-LB 25. In response, the GTP-LB 25 may transport IP packets while maintaining the IP address of the SGW 24 as the source address of the IP packets and changing the destination address of the IP packets to an IP address determined in accordance with a logic in the GTP-LB 25. According to the semi-transparent method, therefore, a Create Session Response from a PGW 26 may be transported to the SGW 24 without going through the GTP-LB 25 and, among C-Plane messages transported between the SGW 24 and the PGW 26, only a Create Session Request can be transported through the GTP-LB 25.

According to the IP termination method, all GTP messages from the SGW 20 and the PGW 22 can be received at the GTP-LB 21. The GTP-LB 21 may thus control each of GTP messages, but a stateless communication, i.e., a communications in which no information is retained by either sender or receiver, is not feasible. According to the semi-transparent method, on the other hand, the GTP-LB 25 can establish a stateless communication because a GTP session is directly established between the SGW 24 and the PGW 26. However, a controllable message is limited to the Create Session Request.

A method and apparatus for routing C-Plane signals according to one embodiment of the present disclosure can accomplish both a stateless communication and a control over the entire C-Plane messages.

Figure 3:
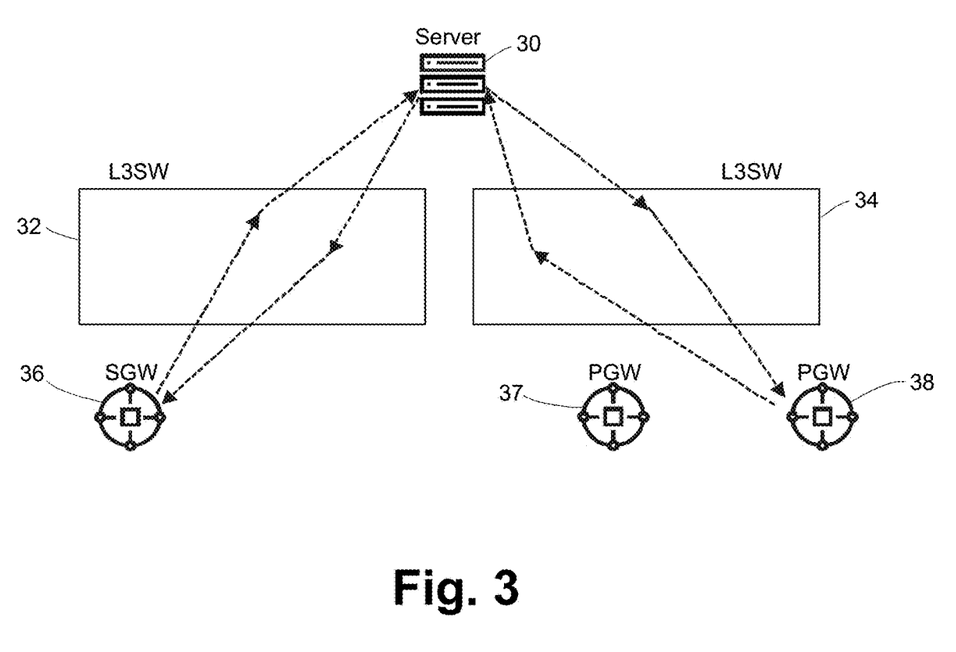
FIG. 3 shows example transport routes for C-Plane signals among a server, an SGW, a PGW and Layer 3 (L3) switches.

FIG. 3 shows an exemplary server 30 installed with a GTP message controller according to one embodiment of the present disclosure. The server 30 may be employed in an LTE network environment as shown in FIG. 1 for establishing transport routes for C-Plane signals with an SGW (SGW 36), a PGW (PGW 38), a first Layer 3 (L3) switch L3SW 32 and a second L3 switch L3SW 34. These devices may be located in an EPC network, and an integrated L3 switch may be used in place of the separate L3 switches L3SW 32 and L3SW 34. The GTP message controller, or the server 30, is assigned with a MAC address and an IP address.

The GTP message controller, or herein referred to as a controller, may include, by way of example, an integrated circuit, semiconductor, memory module, central processing unit (CPU), processing resource, application-specific integrated circuit (ASIC), processor, chipset, virtualized component or other type of management component capable of managing the GTP message.

The first L3 switch L3SW 32 may be disposed between the server 30 and the SGW 36, which may be one of a plurality of SGWs employed as GTP termination devices in an LTE network. The second L3 switch L3SW 34 may be disposed between the server 30 and the PGW 38, which may be one of a plurality of PGWs, including a PGW 37, employed as GTP termination devices in the LTE network for routing IP packets carrying GTP messages. In this example, the first and second L3 switches L3SW 32 and L3SW 34 are disposed in the same segment as the server 30, i.e., the first L3 switch L3SW 32 and the second L3 switch L3SW 34 are L3 switches located at the last stage or at the previous hop from the server 30 for receiving IP packets, and are thus L3 switches located at the first stage or at the next hop from the server 30 for routing IP packets from the server.

The first and second L3 switches L3SW 32 and L3SW 34 may be any conventional L3 switches as far as they are disposed in the same segment as the server 30 and perform routing. Alternatively, they may together form a single L3 switch that performs the functions of the two L3 switches.

The first and second L3 switches L3SW 32 and L3SW 34 may be configured such that, in response to receipt of an IP packet whose destination IP address matching any of a group of specific destination addresses, they forward the IP packet in an Ethernet frame to the server 30. In one example, the group of specific destination addresses included in the first L3 switch L3SW 32 may be IP addresses of a plurality of PGWs of an EPC network, including the PGWs 37 and 38. The group of specific destination addresses included in the second L3 switch L3SW 34 may be IP addresses of a plurality of SGWs included in the EPC network, including the SGW 36. The L3 switches L3SW 32 and 34 can thus forward Ethernet frames containing IP packets to the server 30 regardless the destination IP address of the IP packets.

Figure 4:
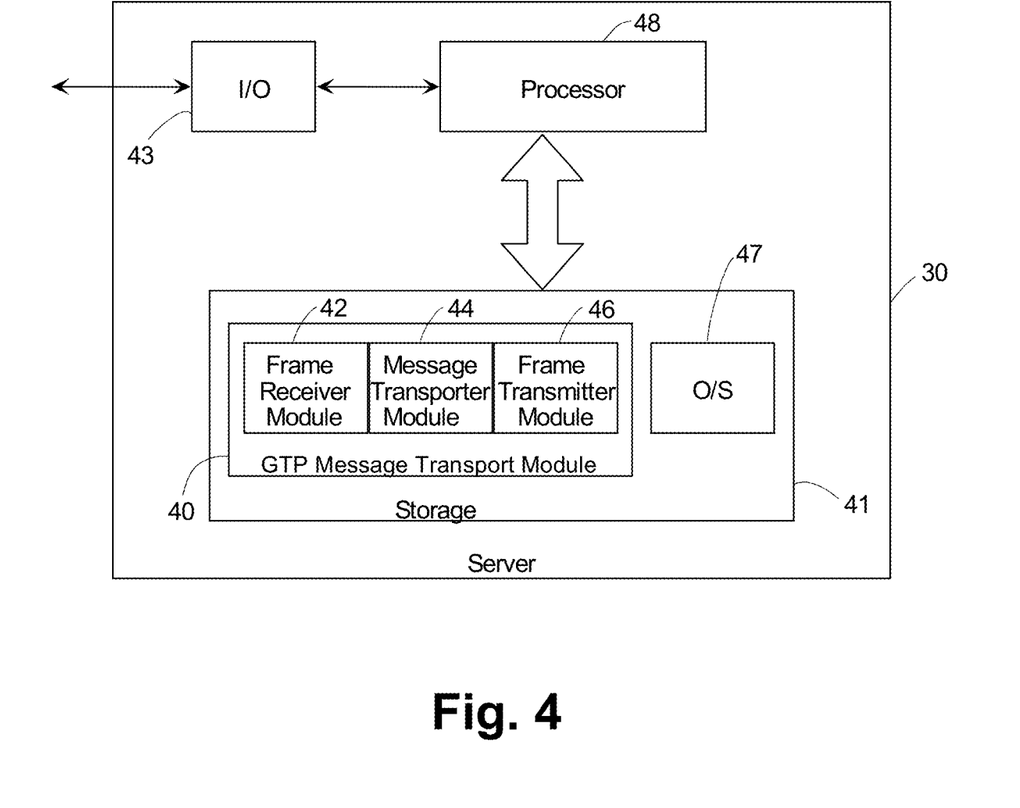
FIG. 4 shows an example functional block diagram of a GTP message controller installed on a server according to one embodiment of the present disclosure.

FIG. 4 shows a functional block diagram of a GTP message controller which may be hardware, instructions executable by a processor, and/or combination thereof to provide such functionality. In one example, the GTP message controller includes modules as described below. Each module may include, by way of example, instructions (e.g., stored on a machine-readable medium) that, when executed (e.g., by controller and/or processor), implements the functionality of the module. Alternatively, or in addition, each module may include electronic circuitry (i.e., hardware) that implements the corresponding functionality.

In one example, the GTP message controller includes a GTP message transport module 40 installed in a storage 41 on the server 30 of FIG. 3. The server 30 may receive via an I/O device 43 Ethernet frames containing IP packets sent from the SGW 36 or the PGW 38 and routed through the first or second L3 switch L3SW 32 or L3SW 34. In response to the GTP message transport module 40 determining that the destination Media Access Control (MAC) address of the received Ethernet frames matches the MAC address of the server 30, the GTP message transport module 40 may create IP packets for carrying the same GTP message as that carried by the received IP packets or a modified GTP message. The message may be transmitted via the I/O device 43 in the form of Ethernet frames containing the created IP packets to the next L3 switch, which may be the second or first L3 switch L3SW 34 or L3SW 32.

As shown in FIG. 4, the server 30 may include a processor 48 directed by an operating system 47 and execute instructions stored in a GTP message transport module 40. The GTP message transport module 40 may include a frame receiver module 42 for providing instructions to receive Ethernet frames, a message transporter module 44 for providing instructions to edit GTP messages contained in the received Ethernet messages, and a frame transmitter module 46 for providing instructions to transmit Ethernet frames containing GTP messages and edited with the message transporter module 44. As mentioned above, the frame receiver module 42, the message transporter module 44 and the frame transmitter module 46 may each be hardware, instructions executable by a processor, and/or combination thereof to provide such functionality.

In one embodiment, the storage 41 may be any machine-readable storage, such as a Random Access Memory (RAM), an Electrically-Erasable Programmable Read-Only Memory (EEPROM) or the like that stores executable instructions for implementing the functions of the GTP message transport module 40. The functions of the frame receiver module 42, the message transporter module 44, and the frame transmitter module 46 may be performed by the processor 48 executing instructions stored in the modules. For example, the GTP message controller may comprise a receiver, a transporter and a transmitter to perform functions corresponding to instructions of the modules 42, 44 and 46 executed by the processor 48 in cooperation with the I/O device 43.

The frame receiver module 42 may be configured to receive Ethernet frames containing IP packets carrying a GTP message from the first and second L3 switches L3SW 32 and L3SW 34, to determine that the destination MAC address of the received frame matches the MAC address of the server 30, and to pass the GTP message carried by the IP packets contained in the Ethernet frames to the message transporter module 44.

The message transporter module 44 may select the destination IP address of one or more IP packets carrying the GTP message. The selection may be made based on the contents of the GTP message, such as a session establishing request or a session modifying request received from the frame receiver module 42. The destination IP address may be the same as or different from the destination IP address of the received IP packets. The message transporter module 44 may be capable of editing GTP messages contained in the Ethernet frames according to a desired logic.

The frame transmitter module 46 may create IP packets for carrying GTP messages received from the message transporter module 44. The source IP address of the created IP packets may be set to be the same as that of the received IP packets, and the destination IP address of the created IP packets may be set to be the IP address selected by the frame transporter module 44. The frame transmitter module 46 may transmit Ethernet frames containing those IP packets. For example, in response to the destination IP address matching any one of a group of IP addresses associated with the PGW 38, the frame transmitter module 46 may transmit Ethernet frames whose destination MAC address matches the MAC address of the second L3 switch L3SW 34. For example, in response to the destination IP address matching any one of a group of IP addresses associated with the SGW 36, the frame transmitter module 46 may transmit Ethernet frames whose destination MAC address matches the MAC address of the first L3 switch L3SW 32.

With reference to FIGS. 3 and 4 together, an example sequence of messages from the transmission of a session establishing request from the SGW 36 will now be described. The session is initiated by an attachment request from a wireless device such as the UE1 shown in FIG. 1, and continues to the transmission of a session establishing response from the PGW 38.

As described in connection with FIG. 1, the attachment request may be sent from the wireless terminal to an eNodeB. An MME may acquire the IP address of an SGW, which may be the SGW 36, and the IP address of a PGW, which may be the PGW 38, and the SGW 36 may transmit IP packets carrying a session establishing request whose destination IP address is the IP address of the PGW 38.

The first L3 switch L3SW 32 may receive the IP packets from the SGW 36. As the destination IP address of the IP packets matches the IP address of the PGW 37, which is included in the associated EPC network, the first L3 switch L3SW 32 transfers the received IP packets to the server 30.

The frame receiver module 42 of the message transport module 40 installed on the server 30 may receive Ethernet frames transmitted from the first L3 switch L3SW 32 to determine whether or not the destination MAC address of the received frames matches the MAC address of the server 30. If a match is found, the frame receiver module 42 passes the session establishing request carried by the IP packets contained in the Ethernet frames to the message transporter module 44.

On the basis of the contents of the session establishing request carried by the received Ethernet frames, such as a GTP header or information elements of the wireless terminal such as a Mobile Subscriber ISDN Number (MSISDN), an International Mobile Subscriber Identity (IMSI) and an International Mobile Equipment Identity (IMEI), the message transporter module 44 may select an IP address of a PGW associated with the contents. For example, the message transporter module 44 may derive the IMSI of the wireless terminal and select the IP address of the PGW 38 associated with the IMSI. The selected IP address may be different from the IP address of the PGW 37 selected by the MME, i.e., the IP address designated in the F-TEID field of the session establishing request from the MME.

The frame transmitter module 46 may generate IP packets for transporting the same session establishing request as the received session establishing request, and send out Ethernet frames containing the IP packets. In this case, the source address of the IP packets, i.e., the IP address of the SGW 36 is unaltered, and the generated IP packets may be set to include the selected IP address of the PGW 38 as the destination IP address of the IP packets.

The IP packets contained in the Ethernet frames may be forwarded to the second L3 switch L3SW 34, and routed to the PGW 38 through any intervening L3 switches. The PGW 38 may send out IP packets for carrying a session establishing response. In this case, the F-TEID field contained in the response may be set to include the IP address of the PGW 38, i.e., the IP address of a counterpart PGW to which the SGW 36 sends a GPRS Tunneling Protocol for Control Plane (GTP-C) request, as the IP address of an S5/S8-C interface with the PGW 38. The destination IP address of the response may be the IP address of the SGW 36.

The second L3 switch L3SW 34 may receive the IP packets carrying the session establishing response sent out from the PGW 38. As the destination IP address of the IP packets may be the IP address of the SGW 36, the second L3 switch L3SW 34 may transfer the received IP packets to the server 30. The frame receiver module 42 of the message transport module 40 may receive Ethernet frames containing the IP packets from the second L3 switch L3SW 34, and determine whether the destination MAC address of the received frames matches the MAC address of the server 30. If a match is found, the frame receiver module 42 passes the session establishing response carried by the IP packets to the message transporter module 44. The message transporter module 44 may pass the received Ethernet frames to the frame transmitter module 46, with or without altering the session establishing response.

The frame transmitter module 46 may generate IP packets for carrying the same session establishing response as the received one, and transmit Ethernet frames containing the IP packets. In this case, neither the source IP address nor the destination IP address of the IP packets is altered, and the received Ethernet frames may be transported to the SGW 36.

The IP packets contained in the Ethernet frames may be forwarded to the first L3 switch L3SW 32, and routed to the SGW 36 through any intervening L3 switches. In this manner, a GTP session is established between the SGW 36 and the PGW 38.

As described above, the L3 switches may be set to route Ethernet frames transmitted from the SGW 36 or the PGW 38 to the server 30. The server 30 may receive Ethernet frames, receive GTP messages carried in the Ethernet frames, and transfer the GTP message with or without editing.

The GTP message controller thus receives all GTP messages regardless whether before or after the establishment of a GTP session and, as a result, can edit the messages. Further, the final source and destination IP addresses of a GTP message, such as the IP addresses of the SGW 36 and the PGW 38, may be set in the IP packets received by the GTP message controller. A stateless communication can thereby be achieved without keeping the session information in the GTP message controller.

Application Examples

Summaries of several use cases of a server installed with the GTP message controller in accordance with the present disclosure will now be described. The following use cases as described herein are provided as a means of examples and as such is not meant for limiting the present disclosure.

Use Case 1—Local Breakout

Figure 5:
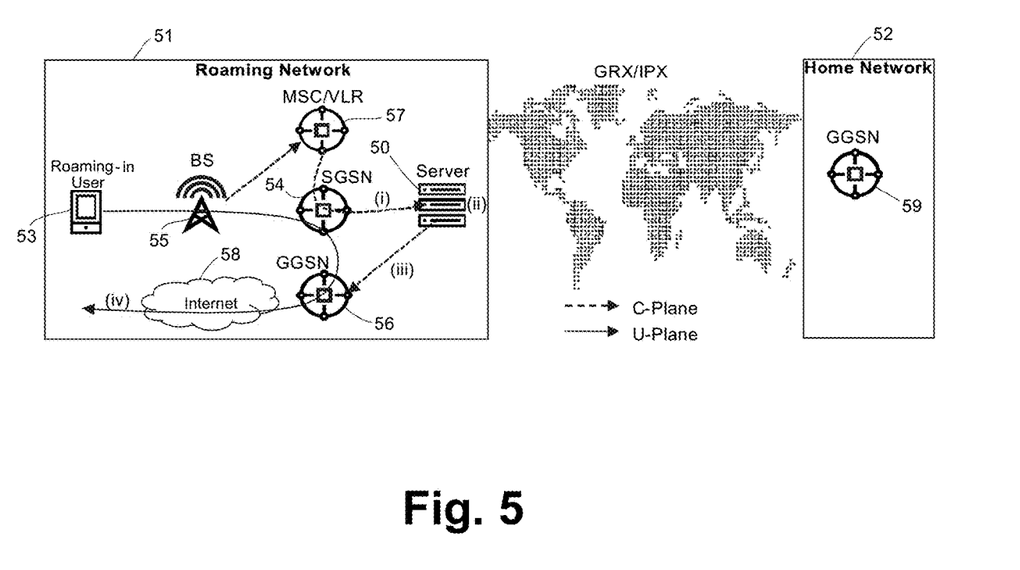
FIG. 5 shows one example of a procedure for implementing local breakout by utilizing a server installed with the GTP message controller according to one embodiment of the present disclosure.

With the use of a server 50 installed with a GTP message controller in accordance with one embodiment of the present disclosure, a so-called local breakout can be readily accomplished for accessing a home network 52, such as a network of AT&T in the US, from a visited network, i.e., a roaming network 51 such as a network of NTT Docomo in Japan, as shown in FIG. 5.

While the server 50 installed with the GTP message controller of the present disclosure is located in the roaming network 51 in the example shown in FIG. 5, the location of the server 50 is not limited to such geometry.

In the roaming network 51, among L3 switches (not shown) for transferring Ethernet frames carrying GTP messages received from a Serving GPRS Support Node (SGSN) 54, L3 switches in the same segment as the server 50 may be set to route the received Ethernet frames to the server 50, unless the destination IP address of IP packets contained in the Ethernet frames matches the IP address of a Gateway GPRS Support Node (GGSN) 56, which represents any of GPRSs in the roaming network 51.

A roaming-in user may request attachment to an eNodeB 55 from a mobile telephone 53 within the roaming network 51 by way of international roaming. A Mobile-services Switching Center/Visitor Location Register (MSC/VLR) may specify the SGSN 54 and a GGSN 59 in the home network 52, and one or more Ethernet frames carrying a session establishing request may be transmitted from the SGSN 54 and received by the L3 switches. As the destination IP address of IP packets contained in the Ethernet frames matches the IP address of the GGSN 59 in the home network 52 and does not match the IP address of the GGSN 56 in the roaming network 51, the L3 switches may transport the Ethernet frames containing the IP packets to the server 50 for transporting the session establishing request from the SGSN 54 (see (i) in FIG. 5).

The server 50 may have the same configuration as the server 30 shown in FIG. 4. The frame receiver module 42 of the message transport module 40 installed on the server 50 may determine whether or not the destination MAC address of the received Ethernet frames matches the MAC address of the server 50, and pass the frames on to the message transporter module 44 if a match is determined. In response to the message transporter module 44 determining that the destination IP address of IP packets contained in the received Ethernet frames does not match the IP address of the GGSN 56 in the roaming network, the destination IP address of the session establishing request carried in the frames may be changed to the IP address of the GGSN 56 in the roaming network. The message transport module 40 may generate IP packets for transferring the session establishing request with the changed IP address (see (ii) in FIG. 5), and transmit Ethernet frames containing the IP packets to the GGSN 56 (see (iii) in FIG. 5).

A GTP session between the mobile telephone 53 and the Internet 58 can thereby be established through the SGSN 54 and the GGSN 56 in the roaming network 51 without going through the server 50 and, as a result, traffics between the mobile telephone 53 in the roaming network 51 and the Internet 58 can be directly transferred from the roaming network 51 to the Internet 58 (see (iv) in FIG. 5), without going through a relaying network, such as an IP exchange (IPX) or a GPRS roaming exchange (GRX) operator that relays data communications between carriers.

As described above, with the use of the message transport module of the present disclosure, local breakout can be readily accomplished during roaming, by merely setting routing through the L3 switches in the same segment as the server.

Use Case 2—Handover Process for Multi-Access Edge Computing in Mobile Network

Figure 6:
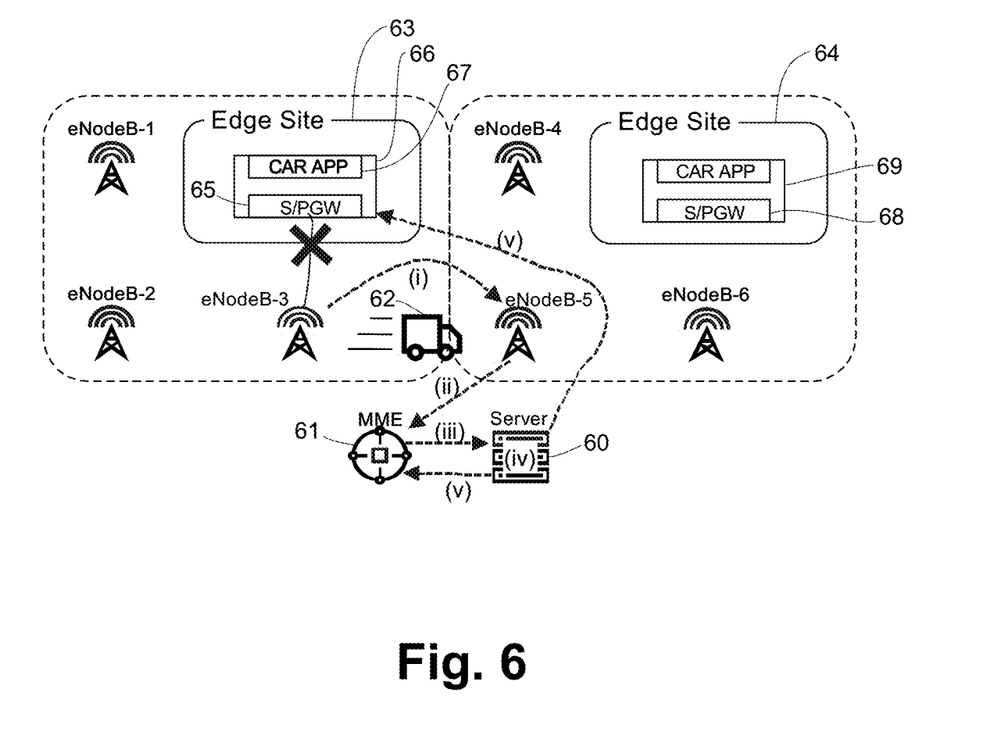
FIG. 6 shows one example of a procedure for implementing hand over in a mobile network in a multi-access edge computing environment.

FIG. 6 illustrates one example of a procedure for implementing hand over in a multi-access edge computing environment realized in a mobile network utilizing a server installed with the GTP message controller according to one embodiment of the present disclosure.

In this case of use, L3 switches (not shown) in the same segment as a server 60 may be set to transfer Ethernet frames containing IP packets received from an MME 61 to the server 60. Further, the server 60 may include in its storage a table defining a relationship of correspondence between the identification information of a wireless terminal contained in the session establishing request, eNodeBs, and edge sites.

For example, the table may define a relationship that the wireless terminal, which may be carried on a car 62, located within ranges covered by eNodeB-1 to eNodeB-3 is connected to an edge site 63, and the wireless terminal located within ranges covered by eNodeB-4 to eNodeB-6 is connected to an edge site 64.

The server 60 may have the same configuration as the server 30 shown in FIG. 4. The message transporter module 44 may determine, with reference to the table, whether or not a handover is happening between different edge sites. If the handover is happening between different edge sites, such as the edge site 63 and the edge site 64, the frame transmitter module 46 may transmit one or more Ethernet frames containing that information.

For example, as the car 62 moves from a range covered by the eNodeB-3 to a range covered by the eNodeB-5 (see (i) in FIG. 6), the eNodeB-5 may transmit a Path Switch Request to the MME 61 (see (ii) in FIG. 6), in accordance with the handover procedure prescribed in The 3rd Generation Partnership Project (3GPP). The MME 61 may transmit onto the C-Plane one or more Ethernet frames containing IP packets for transporting a Modify Bearer Request, so as to notify the edge site 63 of the IP address of the eNodeB-5, and the Ethernet frames may be routed to the server 60 through the L3 switches (see (iii) in FIG. 6).

The message transporter module 44 of the message transport module 40 may determine from the Modify Bearer Request carried in the Ethernet frames that the handover is happening between different edge sites (see (iv) in FIG. 6).

The frame transmitter module 46 may generate one or more Ethernet frames containing information that notifies a change of edge site, and the Ethernet frames may be transmitted from the frame transmitter module 46 to a Serving and Packet data network Gateway (S/PGW) 65 in the edge site 63 (see (v) in FIG. 6). The S/PGW 65 may be located in an edge server 66 containing a car application 67.

The S/PGW 65 can disconnect communication between the S/PGW 65 and the eNodeB-3, and the wireless terminal on the car 62 can connect to a S/PGW 68 in an edge server 69 in the edge site 64 by making an attachment request.

Use Case 3—Load Balancing and Redundancy

A plurality of GTP-LBs may be provided between an SGW and a PGW for load balancing and redundancy. In a load balancing technique called Round Robin DNS, a DNS is configured to return a plurality of IP addresses to a query made with the same APN, so that accesses can be distributed across the plurality of GTP-LBs. However, Round Robin DNS does not verify whether or not the GTP-LBs are normally operating, and packets from the SGW can be sent to a failed GTP-LB.

A dedicated load balancing device having a health-checking function may be used to enable the SGW to send packets only to normally operating GTP-LBs, but the provision of such a device is generally costly. A server installed with a GTP message controller according to the present disclosure can be used instead of the GTP-LBs.

Figure 7:
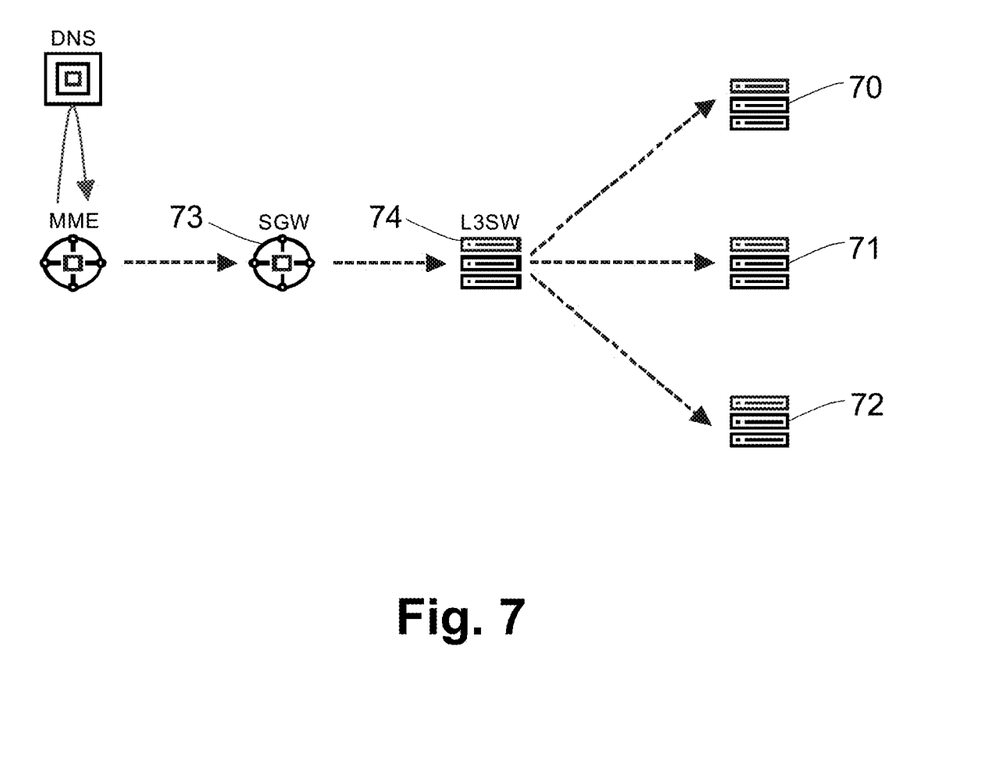
FIG. 7 shows an example load balancing and redundant arrangement of servers according to one embodiment of the present disclosure.

FIG. 7 shows load balancing and redundant arrangement of servers according to the present disclosure. A plurality of servers, such as servers 70-72 are provided for load balancing and redundancy, and an L3 switch 74 may be located at the previous hop from the servers 70-72 and may be set to distribute packets from an SGW 73 to the respective servers 70-72 by setting the L3 switch 74 to have IP addresses of the servers as the next-hop routing information. If the L3 switch 74 is set to perform load balancing by equal cost static routes, the L3 switch 74 can distribute packets from the SGW 73 to the servers 70-72 in a round robin manner.

Each of the servers 70-72 may be configured to receive Ethernet frames in response to the destination MAC address of Ethernet frames received from the L3 switch 74 matching its own MAC address. The servers 70-72 can thus receive and process Ethernet frames addressed to them and forwarded from the L3 switch 74 according to the routing information. As the L3 switch 74 may be provided with a health-checking function for determining whether or not a routed device is normally operating, packets may not be sent if one of the servers 70-72 has failed.

The servers 70-72 and the L3 switch 74 disposed at the previous hop from the servers can provide load balancing and redundancy of servers without requiring a dedicated apparatus.

In the event that all of the servers 70-72 are failed, packets may still be delivered from the SGW 73 to PGWs through an alternative route, by setting the routing information appropriately in the L3 switch 74 as will be described with reference to FIG. 8.

Figure 8:
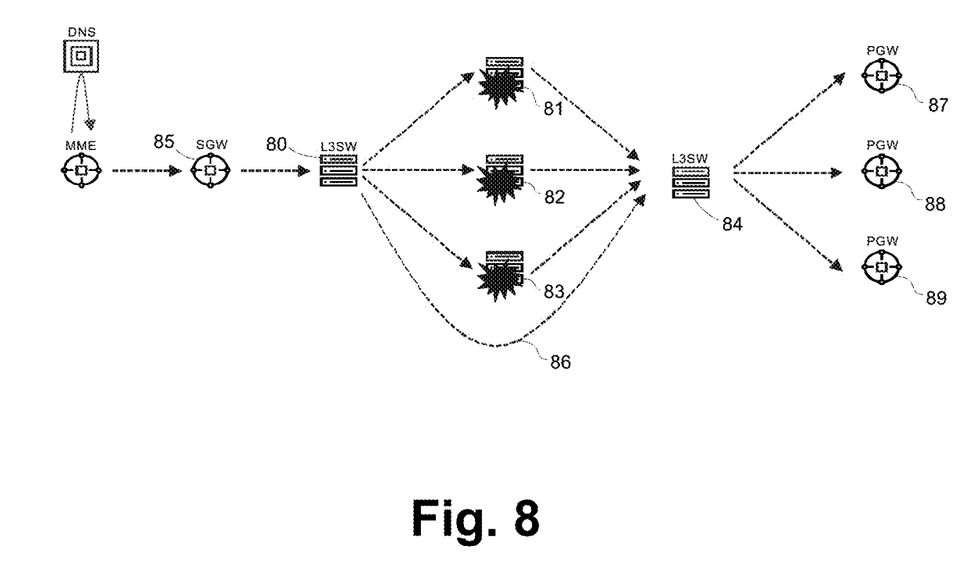
FIG. 8 shows another example load balancing and redundant arrangement of servers according to one embodiment of the present disclosure.

FIG. 8 shows an L3 switch 80 which may correspond to the L3 switch 74 shown in FIG. 7. In addition to the routing information of the L3 switch 74, the L3 switch 80 may include the IP address of an L3 switch 84 as next-hop routing information, but this additional routing information may have the lowest priority. In the event that all of the normal route destination, such as servers 81-83 have failed, the switch L3SW 80 can detect the failure through the health-checking function.

The switch L3SW 84 may thus be selected as the route destination for the packets from an SGW 85, and the configuration shown in FIG. 8 may be operable for transporting the packets from the SGW 85 to the switch L3SW 84 via an alternative route 86, without going through any of the servers 81-83. The switch L3SW 84 may be operated to route the received packets to PGWs 87-89 as if they were received from the servers 81-83.

The method and apparatus of the present disclosure have been described for use in the 4G LTE network environment, but it will be understood that the present disclosure may equally be applicable to the 3G network and the 5G network environment. For example the SGSN, GGSN, and Home Location Resister (HLR) in the 3G and/or 5G network environment may correspond to the SGW, PGW and HSS. Additionally, the Create PDP Context Request and Create PDP Context Response messages in the 3G and/or 5G network environment may correspond to the aforementioned Create Session Request and Create Session Response messages.

What is claimed is:

1. A method comprising:
   receiving, by a controller, a first Ethernet frame containing a first Internet Protocol (IP) packet carrying a first General Packet Radio Service (GPRS) Tunneling Protocol (GTP) message transmitted from a first termination device, the first Ethernet frame received in response to a determination that an initial destination IP address of the first IP packet matches any of a group of specific IP addresses, wherein the group of specific IP addresses comprises IP addresses included in a group of Layer 3 (L3) switches;
   in response to the controller determining that a destination Media Access Control (MAC) address included in the received first Ethernet frame matches a MAC address assigned to the controller:
   based on an element included in the first GTP message, selecting a final destination IP address that is assigned to a second termination device; and
   based on the selected final destination IP address, transmitting the first Ethernet frame containing the first IP packet carrying the first GTP message to the second termination device.

2. The method of claim 1 wherein the first Ethernet frame containing the first IP packet carrying the first GTP message transmitted from the first termination device is forwarded to the controller by a first L3 switch.

3. The method of claim 2 wherein the first Ethernet frame containing the first IP packet carrying the first GTP message is forwarded to the controller in response to the L3 switch determining that the initial destination IP address matches any of the first group of specific addresses.

4. The method of claim 1 comprising:
   receiving, by the controller, a second Ethernet frame containing a second IP packet carrying a second GTP message from the second termination device via a second L3 switch in response to a determination by the second L3 switch that an initial destination IP address of the second IP packet carrying the second GTP message matches any of a second group of specific IP addresses.

5. The method of claim 1 comprising:
   setting an IP address of the first termination device as a source address of the first IP packet carrying the first GTP message.

6. The method of claim 1 comprising:
   editing, by the controller, the first GTP message; and
   transmitting to the second termination device the first Ethernet frame containing the first IP packet carrying the edited GTP message.

7. The method of claim 1 wherein the first GTP message includes at least one of the following: a Mobile Subscriber ISDN Number (MSISDN), an International Mobile Subscriber Identity (IMSI), or an International Mobile Equipment Identity (IMEI) of a wireless terminal.

8. An apparatus comprising:
   a processor coupled to a memory, the processor configured to:
   receive a first Ethernet frame containing a first Internet Protocol (IP) packet carrying a first General Packet Radio Service (GPRS) Tunneling Protocol (GTP) message transmitted from a first termination device, the first Ethernet frame received in response to a determination that an initial destination Internet Protocol (IP) address of the first IP packet matches any of a group of specific IP addresses, wherein the group of specific IP addresses comprises IP addresses included in a group of Layer 3 (L3) switches;
   select, in response to determining that a destination Media Access Control (MAC) address included in the received first Ethernet frame matches a MAC address assigned to the apparatus, a final destination IP address that is assigned to a second termination device based on an element included in the GTP message; and
   transmit the first Ethernet frame containing the first IP packet carrying the first GTP message to the second termination device.

9. The apparatus of claim 8 wherein the first Ethernet frame containing the first IP packet transmitted from the first termination device is received from a first L3 switch.

10. The apparatus of claim 9 wherein the first Ethernet frame containing the first IP packet carrying the first GTP message is received by the L3 switch in response to the L3 switch determining that the initial destination IP address of the first IP packet matches any of the first group of specific IP addresses.

11. The apparatus of claim 8 wherein:
    in response to the second termination device receiving the first GTP message, receiving a second Ethernet frame containing a second IP packet carrying a second GTP message transmitted from the second termination device; and
    in response to determining that a MAC address included in the second Ethernet frame containing the second IP packet carrying the second GTP message matches the MAC address of the apparatus, transmitting the second Ethernet containing the second IP packet carrying the second GTP message to the first termination device.

12. The apparatus of claim 8 wherein the processor is further configured to set an IP address of the first termination device as a source address of the first IP packet carrying the first GTP message.

13. The apparatus of claim 8 wherein the processor is further configured to edit the first GTP message, and transmit the first Ethernet frame containing the first IP packet carrying the edited GTP message to the second termination device.

14. The apparatus of claim 8 wherein the element included in the GTP message includes at least one of the following: a Mobile Subscriber ISDN Number (MSISDN), an International Mobile Subscriber Identity (IMSI), or an International Mobile Equipment Identity (IMEI) of a wireless terminal.

15. The apparatus of claim 8, wherein the processor is further configured to receive a second Ethernet frame containing a second IP packet carrying a second GTP message from the second termination device via a second L3 switch in response to a determination by the second L3 switch that an initial destination IP address of the second IP packet carrying the second GTP message matches any of a second group of specific IP destination addresses.

16. A non-transitory machine-readable storage medium encoded with instructions executable by a processor, that when executed causes a computing device to:
    receive an Ethernet frame containing an Internet Protocol (IP) packet carrying a General Packet Radio Service (GPRS) Tunneling Protocol (GTP) message transmitted from a first termination device, the Ethernet frame received in response to a determination that an initial destination Internet Protocol (IP) address of the IP packet matches any of a group of specific IP addresses, wherein the group of specific IP addresses comprises IP addresses included in a group of Layer 3 (L3) switches;

determine that a destination Media Access Control (MAC) address included in the received Ethernet frame matches a MAC address assigned to the computing device;

select a final destination IP address that is assigned to a second termination device based on an element included in the GTP message; and transmit the Ethernet frame containing the IP packet carrying the GTP message to the second termination device.

17. The non-transitory machine-readable storage medium of claim 16 comprising instructions that when executed cause the computing device to set an IP address of the first termination device as a source address of the IP packet carrying the GTP message.

18. The non-transitory machine-readable storage medium of claim 16, comprising instructions that when executed the computing device to edit the GTP message.

19. The non-transitory machine-readable storage medium of claim 16 wherein the GTP message includes at least one of the following: a Mobile Subscriber ISDN Number (MSISDN), an International Mobile Subscriber Identity (IMSI), or an International Mobile Equipment Identity (IMEI) of a wireless terminal.

* * * * *